May 22, 1945. S. R. CARLSON 2,376,344
TURRET LATHE SPINDLE CENTER AND STOP
Filed May 25, 1943
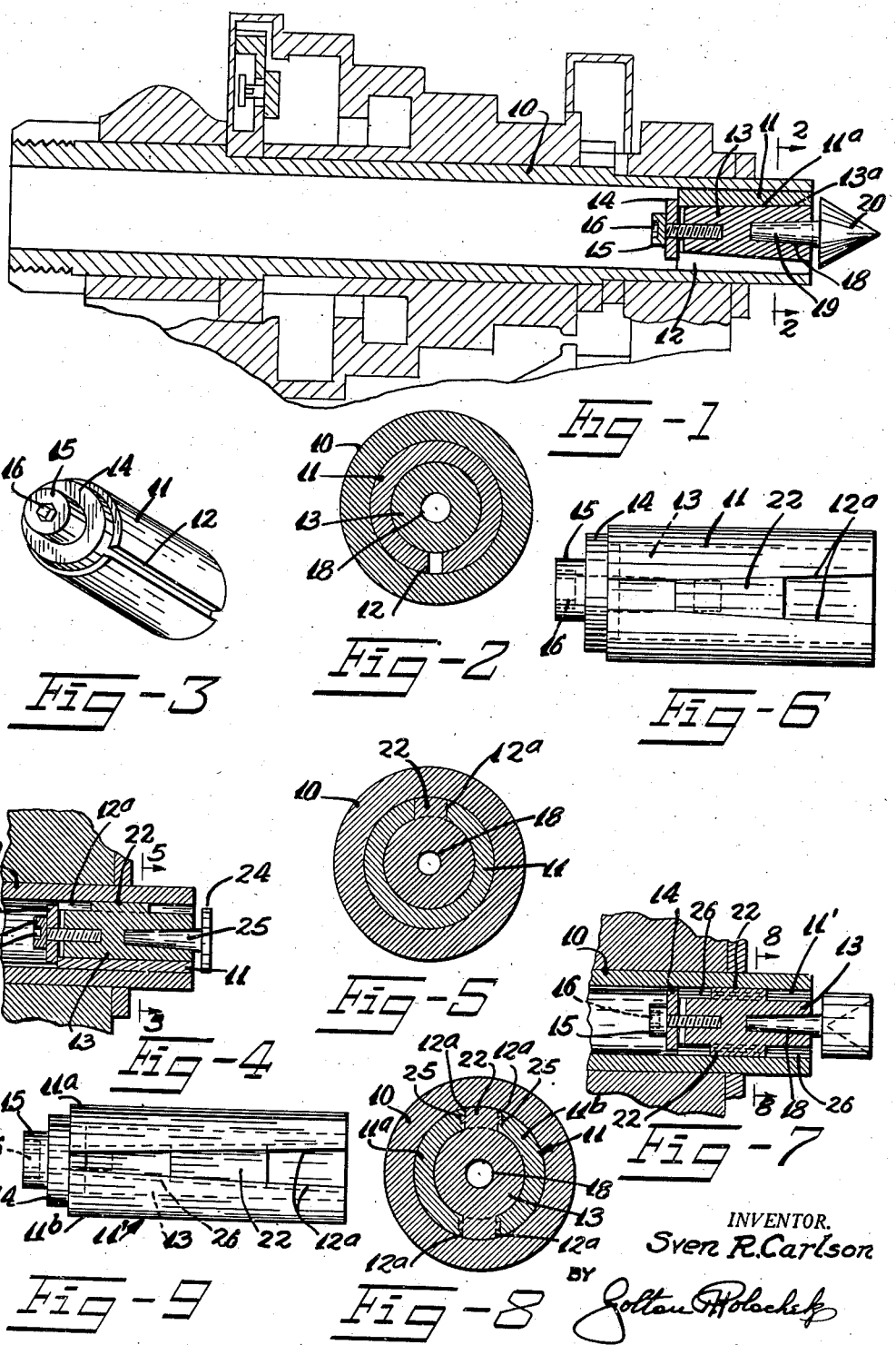
INVENTOR.
Sven R. Carlson
BY
ATTORNEY Patented May 22, 1945

2,376,344

UNITED STATES PATENT OFFICE 2,376,344

TURRET LATHE SPINDLE CENTER AND STOP

Sven E. Carlson, Floral Park, N. Y.

Application May 25, 1943, Serial No. 488,397

6 Claims. (Cl. 82—34)

This invention relates to new and useful improvements in a lathe spindle center and stop.

More particularly, it is proposed to characterize the new center and stop by a sleeve slightly smaller than the inner diameter of the hollow spindle of the lathe and split open along one side, and a lock stock cooperative with said sleeve in a certain way to lock the sleeve in position in the hollow spindle.

More particularly, it is proposed to associate the lock stock with means by which it may be moved to various longitudinal positions in the hollow spindle, and to associate complementary elements on the lock stock and sleeve for expanding the sleeve when the lock stock is moved in one direction relative to the sleeve.

Numerous forms of the invention are proposed each of which embodies the essential features of this invention. In one form it is proposed that the complementary elements previously mentioned be in the nature of a taper on the outer surface of the lock stock cooperative with a complementary taper on the inner surface of the sleeve.

In another form, the invention proposes characterizing the complementary elements by a taper along the split opening of the sleeve, and a projection from the lock stock engaging into the split opening and having sides engaging said taper.

Additional forms will become clear as this specification proceeds.

For further comprehension of the invention, and of the objects and advantages thereof, reference will be had to the following description and accompany drawing, and to the appended claims in which the various novel features of the invention are more particularly set forth.

In the accompanying drawing forming a material part of this closure—

Fig. 1 is a fragmentary longitudinal sectional view of the hollow spindle of a lathe which is illustrated provided with a center and stop constructed in accordance with this invention.

Fig. 2 is a transverse sectional view taken on the line 2—2 of Fig. 1.

Fig. 3 is a perspective view of the center and stop ilustrated per se.

Fig. 4 is a fragmentary longitudinal sectional view similar to Fig. 1 but illustrating a modified construction.

Fig. 5 is a transverse enlarged sectional view taken on the line 5—5 of Fig. 4.

Fig. 6 is an enlarged elevational view of the center and stop illustrated in Fig. 4.

Fig. 7 is another sectional view similar to a portion of Fig. 1 but illustrating another modified form of the invention.

Fig. 8 is an enlarged sectional view taken on the line 8—8 of Fig. 7.

Fig. 9 is an elevational view of the center and stop illustrated in Figs. 7 and 8.

The lathe spindle center and stop, in accordance with this invention, is intended to be used in combination with a hollow cylindrical spindle 10 of a lathe or similar machine. The details of the lathe will not be given in this specification as it forms no part of the invention, and lathes of this type are generally known. The new center and stop includes a sleeve 11 slightly smaller in outside diameter than the inner diameter of the spindle 10. This sleeve 11 has a slit 12 along one side. A lock stop 13 is longitudinally movably mounted in the sleeve 11. This stock 13 is associated with means by which it may be longitudinally moved. The particular means shown on the drawing comprises a washer 14 engaged against one end of the sleeve 11, and a screw 15 rotatively engaged through the washer and threadedly into the lock stock 13. This screw 15 preferably has a head with the socket opening 16 for a socket wrench or other turning tool.

The lock stop 13 and the sleeve 12 are associated with complementary elements for expanding the sleeve 11 when the lock stock 13 is moved in one direction. These complementary elements comprise a tapered outer face 13ª formed on the lock stock 13 and engaging a complementary tapered inner face 11ª formed on the sleeve 11. The lock stock 13 is formed with a bore 18 for the tapered shank 19 of a center 20 or other similar type of member.

The operation of the center and stop is as follows:

In Fig. 1 the center and stop is shown mounted within the inner end of the hollow cylindrical spindle 10 of a lathe. A male movable center 20 is shown mounted in the tapered bore 18. This center may be romoved when desired. The center and stop may be shifted to different positions within the hollow cylindrical spindle 10 by engaging a socket wrench or other type of wrench through the free end of the spindle 10 and turning the screw 15 to loosen the lock stock 13. When this is done the sleeve 11 naturally contracts and the center and stop becomes free in the hollow cylindrical spindle 10. It may then be shifted to any new position. It may be romoved, if desired. It may be reset merely by screwing in the screw 15 to move the lock stock 13 so as to again cause the sleeve 11 to become expanded.

In Figs. 4–6 inclusive a modified form of the invention is disclosed which distinguishes from the prior form in the construction of the complementary elements on the lock stock 13 and the sleeve 11 for expanding the sleeve 11 to lock the device in position. These complementary elements comprise a projection 22 on the side of the lock stock 13 engaging into a slit 12ª formed in the side of the sleeve 11. This slit 12ª has tapered sides, as clearly shown in Fig. 6. The projection 22 has similarly tapered sides. In other respects this form of the invention is identical to the previous form and like parts are indicated by like reference numerals. A disc-shaped stop 24 with a taper 25 is shown engaged in the tapered bore 18 of the lock stock 13.

The operation of this form of the invention is as follows:

The screw 15 may be turned to move the lock stock 13 so that the projection 22 spreads the slit 12ª and thus expands the sleeve 11 for locking it in position within the hollow cylindrical spindle.

In Figs. 7 to 9 another form of the invention is shown which is very similar to the form shown in Figs. 4-6, distinguishing merely in the fact that the sleeve 11' is formed from two half sections 11ª and 11ᵇ. The lock stock 13 is provided with a pair of diametrically opposite projections 22 which engage in between the ends of the sections 11ª and 11ᵇ. These ends, indicated by reference numerals 12ª, are tapered and the projections 22 are similarly tapered. The projections 22 are slidably connected with the ends of the sections 11ª and 11ᵇ by dove tailed side portions 25 engaging complementary grooves 26 in the ends 12ª. In other respects this form of the invention is similar to that previously shown and like reference numerals identify like parts in each of the several views.

The operation of this form of the invention is as follows:

The screw 15 is turned to longitudinally move the lock stock 13. When this lock stock moves in one direction the projections 22 will cam apart the sections 11ª and 11ᵇ which form the sleeve 11' and thus lock said sleeve within the hollow cylindrical spindle. When the screw 15 is turned in the other direction the lock stock 13 is moved so that the projections 22 draw together and thus contract the sections 11ª and 11ᵇ which form the sleeve 11'.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. In combination with a hollow cylindrical spindle, a sleeve slightly smaller than the inner diameter of said spindle and split open along one side, a lock stock longitudinally movably mounted in said sleeve, means for longitudinally moving said lock stock, and complementary elements on said lock stock and sleeve for expanding the sleeve when said lock stock is moved in one direction, comprising a projection from the lock stock engaging the slit of said sleeve, and said projection having tapered sides engaging complementary tapered sides of said slit.

2. In combination with a hollow cylindrical spindle, a sleeve slightly smaller than the inner diameter of said spindle and split open along one side, a lock stock longitudinally movably mounted in said sleeve, means for longitudinally moving said lock stock, and complementary elements on said lock stock and sleeve for expanding the sleeve when said lock stock is moved in one direction, said sleeve having a second slit opening along another side whereby the sleeve is formed from a pair of separate sections, and said complementary elements comprising projections from the lock stock engaging in said slits, said projections having tapered sides and the sides of said slits being correspondingly tapered.

3. In combination with a hollow cylindrical spindle, a sleeve slightly smaller than the inner diameter of said spindle and split open along one side, a lock stock longitudinally movably mounted in said sleeve, means for longitudinally moving said lock stock, and complementary elements on said lock stock and sleeve for expanding the sleeve when said lock stock is moved in one direction, said sleeve having a second slit opening along another side whereby the sleeve is formed from a pair of separate sections, and said complementary elements comprising projections from the lock stock engaging in said slits, said projections having tapered sides and the sides of said slits being correspondingly tapered, and said projections and the sides of the sections of said sleeve being slidably connected.

4. In combination with a hollow cylindrical spindle, a sleeve slightly smaller than the inner diameter of said spindle and split open along one side, a lock stock longitudinally movably mounted in said sleeve, means for longitudinally moving said lock stock, and complementary elements on said lock stock and sleeve for expanding the sleeve when said lock stock is moved in one direction, said sleeve having a second slit opening along another side whereby the sleeve is formed from a pair of separate sections, and said complementary elements comprising projections from the lock stock engaging in said slits, said projections having tapered sides and the sides of said slits being correspondingly tapered, and said projections and the sides of the sections of said sleeve being slidably connected, with dove tailed tongues engaging dove tailed grooves.

5. In combination with a hollow cylindrical spindle, a sleeve in said spindle and slightly smaller than the inner diameter of said spindle and formed with a tapered split along one side, a lock stock longitudinally movably mounted in said sleeve, means for moving said lock stock longitudinally relative to said sleeve towards the small end of said tapered split, and a tapered projection extending from one side of said lock stock and engaging in said tapered slit to expand said sleeve against the inside of said spindle as the lock stock is moved.

6. In combination with a hollow cylindrical spindle, a sleeve in said spindle and slightly smaller than the inner diameter of said spindle and formed with a tapered split along one side, a lock stock longitudinally movably mounted in said sleeve, means for moving said lock stock longitudinally relative to said sleeve towards the small end of said tapered split, and a tapered projection extending from one side of said lock stock and engaging in said tapered slit to expand said sleeve against the inside of said spindle as the lock stock is moved, said projection being tapered to correspond with the tapered formation of said slit.

SVEN R. CARLSON.